June 27, 1933.  F. A. THOMSON  1,915,392
CONFECTION
Filed Feb. 18, 1933

Inventor:
Florence A. Thomson,
By Jas. C. Wobensmith
Attorney.

UNITED STATES PATENT OFFICE

FLORENCE A. THOMSON, OF PHILADELPHIA, PENNSYLVANIA

CONFECTION

Application filed February 18, 1933. Serial No. 657,345.

My invention relates to confections, and it relates more particularly to pieces of candy, and to the assembly thereof in a vendible form.

In the marketing of certain types of candy, it frequently happens that during shipment or storage, where the pieces of candy are closely arranged, the pieces will stick together, so that it is virtually impossible to separate the same without breaking them. This is particularly objectionable where a number of the individual pieces are assembled in a wrapper in close relationship to form a compact package.

The principal object, therefore, of my present invention is to provide a confection comprising a plurality of pieces of candy which are so shaped as to be separable from each other without likelihood of breakage.

A further object of my invention is so to shape the individual pieces that the same will fit the tongue of the consumer with a greater degree of comfort.

A further object of my invention is to provide a confection comprising a plurality of closely arranged pieces of candy, in which likelihood of breakage of the wrapper in which the same are contained will be minimized.

With the foregoing objects in view, my invention contemplates the provision of a plurality of units of candy, which when arranged in a package in close proximity will contact only at the peripheral portions thereof, to the end that said pieces may be readily separated, and at the same time present an attractive appearance, without ridges or annular depressions, which would tend to break the envelope in which the pieces are contained.

The nature and characteristic features of my invention will be more readily understood from the following description, taken in connection with the accompanying drawing forming part hereof, in which.

Figure 1:
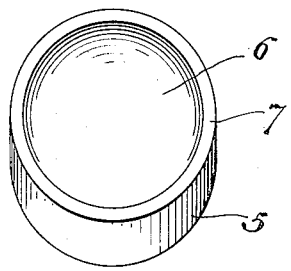
Figure 1 is a perspective view illustrating a preferred form of one of the pieces of candy embodying the main features of my present invention.

Referring now more particularly to Fig. 1 of the drawing, there is there shown, in perspective, one of the separate pieces of candy of my invention, the same being preferably of disk-like form having a cylindrical outer surface 5. Each of the sides of said piece of candy has a central depression, as at 6, which extends close to the outer cylindrical surface 5, thereby providing a narrow peripheral rim portion 7 on each side of the piece of candy.

Figure 2:
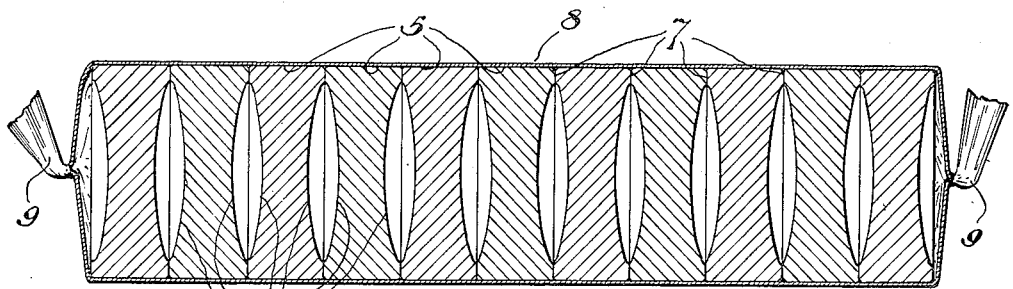
Fig. 2 is a longitudinal section of an assembly of such pieces in the form of a vendible commodity.
Figure 3:
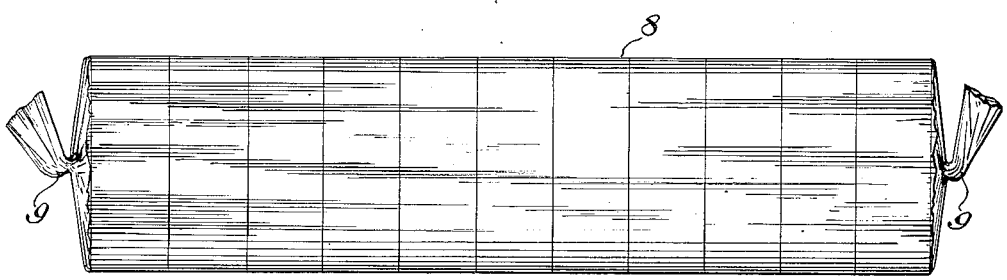
Fig. 3 is an elevational view thereof.

For the purpose of vending the candy, the pieces are assembled as shown in Figs. 2 and 3 of the drawing, with the narrow peripheral rim portions 7 of adjacent pieces of candy contacting with each other. A sheet of "Cellophane" or similar transparent material 8 is wrapped about the assembled candy, and the ends of said sheet closed by being twisted as at 9, to hold the contents of the package together.

When the candies are made of a clear, crystal-like material, and are wrapped in cellophane or the like, as above mentioned, a particularly attractive package is obtained. When it is desired to use the candy the wrapper may be untwisted at one end, and one or more of the pieces readily separated and removed.

Clear, boiled, hard candy, to which my invention is particularly adaptable, sometimes has a tendency to stick. However, when the amount of contacting surface of the individual pieces is small and disposed at the rim as herein set forth, the pieces may be readily separated notwithstanding any stickiness which may occur.

It will also be found that candies shaped as aforesaid will comfortably fit the mouth of the consumer, as the depressions will readily conform to the curvature of the tongue.

The invention has been found in practice to be quite practicable, and has gone into large and successful use.

I claim:

1. A confection comprising a plurality of pieces of candy, each having a depression in the central portion of each side thereof, said depression extending close to the edge to provide a narrow rim directly at the edge, said pieces being assembled with the narrow rim portions abutting and the outer surfaces in register to form a continuous external surface.

2. A confection comprising a plurality of disk-like pieces of candy, each having an outer straight cylindrical surface and having a depression in the central portion of each side thereof, said depression extending close to the edge to provide a narrow rim directly at the edge, said pieces being assembled with the narrow rim portions abutting and the outer surfaces in register to form a continuous cylindrical surface.

3. A confection comprising a plurality of pieces of candy, each having a depression in the central portion of each side thereof, said depression extending close to the edge to provide a narrow rim directly at the edge, said pieces being assembled with the narrow rim portions abutting and the outer surfaces in register to form a continuous external surface, and the whole being contained in a wrapper having its ends closed to retain the pieces in their proper relative positions.

4. A confection comprising a plurality of disk-like pieces of candy, each having an outer straight cylindrical surface and having a depression in the central portion of each side thereof, said depression extending close to the edge to provide a narrow rim directly at the edge, said pieces being assembled with the narrow rim portions abutting and the outer surfaces in register to form a continuous cylindrical surface, and the whole being contained in a wrapper having its ends closed to retain the pieces in their proper relative positions.

5. A confection comprising a plurality of disk-like pieces of candy, each having an outer straight cylindrical surface and having a depression in the central portion of each side thereof, said depression extending close to the edge to provide a narrow rim directly at the edge, said pieces being assembled with the narrow rim portions abutting and the outer surfaces in register to form a continuous cylindrical surface, and the whole being contained in a transparent wrapper having its ends closed to retain the pieces in their proper relative positions.

6. A confection comprising a plurality of disk-like pieces of candy, each having an outer straight cylindrical surface and having a depression in the central portion of each side thereof, said depression extending close to the edge to provide a narrow rim directly at the edge, said pieces being assembled with the narrow rim portions abutting and the outer surfaces in register to form a continuous cylindrical surface, and the whole being contained in a transparent wrapper having its ends twisted to retain the pieces in their proper relative positions.

In testimony whereof, I have hereunto signed my name.

FLORENCE A. THOMSON.